United States Patent [19]

Khalafalla et al.

[11] 4,295,971

[45] Oct. 20, 1981

[54] METHOD FOR CLARIFYING SLIMES

[75] Inventors: Sanaa E. Khalafalla, Minneapolis; George W. Reimers, Burnsville, both of Minn.

[73] Assignee: The United States of America as represented by the Secretary of the Interior, Washington, D.C.

[21] Appl. No.: 177,975

[22] Filed: Aug. 14, 1980

[51] Int. Cl.$^3$ .............................................. C02B 9/02
[52] U.S. Cl. .................................................... 210/695
[58] Field of Search ............................. 210/695, 675; 252/62.52

[56] References Cited

U.S. PATENT DOCUMENTS

| | | | |
|---|---|---|---|
| 3,697,420 | 10/1972 | Blaisdell et al. | 210/695 |
| 3,796,660 | 3/1974 | Kaiser | 210/695 |
| 3,806,449 | 4/1974 | Kaiser | 210/695 |
| 3,844,943 | 10/1974 | Duval | 210/695 |
| 3,917,538 | 11/1975 | Rosensweg | 252/62.52 |
| 3,951,799 | 4/1976 | Weiss et al. | 210/695 |
| 4,017,392 | 4/1977 | Hamer et al. | 210/675 |
| 4,018,691 | 4/1977 | Neal | 252/62.52 |
| 4,019,995 | 4/1977 | Briggs et al. | 252/62.52 |
| 4,094,804 | 6/1978 | Shmoliz et al. | 252/62.52 |
| 4,107,063 | 8/1978 | Kovac et al. | 252/62.52 |
| 4,208,294 | 6/1980 | Khalafalla et al. | 252/62.52 |

Primary Examiner—Theodore A. Granger
Attorney, Agent, or Firm—William S. Brown; Donald A. Gardiner

[57] ABSTRACT

The present invention provides a method for clarifying slimes. This method comprises the steps of treating a slime with a unique flocculant and separating the clarified slime from the aggregated floccules. The flocculant is a stabilized aqueous-base magnetic colloid that contains colloidal magnetic particles and at least one surfactant, such as dodecylamine. The magnetic colloid becomes unstable and the magnetic particles thereof irreversibly flocculate when the magnetic colloid is sufficiently diluted.

11 Claims, No Drawings

//  4,295,971

METHOD FOR CLARIFYING SLIMES

TECHNICAL FIELD

This invention relates to the field of water treatment. More specifically, it is related to the clarification of slimy water by novel treatment of the slime.

BACKGROUND ART

It is known to seed water contaminated with suspended matter, with magnetic material and to use an electromagnetic field to remove the magnetic material and suspended matter. Illustrative of this type of prior art is U.S. Pat. No. 2,232,295 to Urbain, et al., U.S. Pat. No. 2,398,725 to Schutte, U.S. Pat. No. 3,697,420 to Blaisdell, et al., U.S. Pat. No. 3,923,651 to Weiss, et al., U.S. Pat. No. 3,983,033 to de Latour, U.S. Pat. No. 4,089,779 to Neal, U.S. Pat. No. 4,110,208 to Neal, U.S. Pat. No. 4,115,262 to Gustavsson, et al., and U.S. Pat. No. 4,141,687 to Forrest, et al. In certain of this prior art, the use of a positively-charged electrolyte in combination with the magnetic material is known. Exemplary of this art are the Urbain, et al., Blaisdell, et al., and de Latour patents. Certain of these three patents also show the use of flocculating agents that are negatively charged.

Magnetic fluids are also well known in the prior art. Illustrative magnetic fluids are found in U.S. Pat. No. 3,764,540 to Khalafalla, et al., and U.S. Pat. No. 3,843,540 to Reimers, et al. The magnetic fluid of the latter patent is colloidal and has an organic base, such as kerosene. Moreover, use of an organic-base, magnetic colloid of this type for separating non-magnetic particles of different densities is known. U.S. Pat. No. 4,085,037 to Quets, et al. is exemplary.

However, this prior art and the other prior art of which we are aware is deficient in that it is believed that the methods thereof do not provide for particle-to-particle titration, which results in the need for a very small volume of our magnetic colloid to clarify slimes; do not provide for the combination of particle-to-particle titration and a settling time that requires only minutes; and do not, in turn, permit the use of a settling tank that is significantly smaller than that conventionally used, due to the required brief residence time.

DISCLOSURE OF THE INVENTION

It is accordingly one object of the present invention to provide a method for clarifying slimes that provides for particle-to-particle titration, and thus the need for only a very small volume of the magnetic reagent.

A further object of our invention is to provide a method that combines the feature of particle-to-particle titration and the feature of a settling time that requires only minutes.

A still further object is to, in turn, provide for the use of a settling tank that is significantly smaller than that conventionally used, due to the required brief residence time.

Other objects and advantages of the present invention will become apparent as the description thereof proceeds.

In satisfaction of the foregoing objects and advantages, there is provided by this invention a method for clarifying slimes. This method includes the steps of treating a slime with a unique flocculant and separating the clarified slime from the aggregated floccules. Our unique flocculant is a stabilized aqueous-base magnetic colloid containing (1) colloidal magnetic particles and (2) at least one surfactant of a certain type. This surfactant bridges the slime particles electrostatically to the magnetic particles and stabilizes the magnetic particles, and is present in an amount sufficient to perform the bridging and stabilization functions. The magnetic colloid becomes unstable and the magnetic particles thereof irreversibly flocculate when the saturation magnetization of the magnetic colloid is sufficiently diluted. The magnetic colloid is used in an amount sufficient to provide for particle-to-particle titration between the slime particles and the magnetic particles. As a result of our treatment step, the magnetic particles form floccules with the slime particles. In the preferred embodiment of our method, a negatively-charged slime is treated with an amine-stabilized magnetic colloid that has a net positive charge. The amine-stabilizing agent is a n-$C_{10}$ to n-$C_{15}$ aliphatic amine.

BEST MODE FOR CARRYING OUT THE INVENTION

As discussed above, the present invention is concerned with a method for clarifying slimes. The essential steps of this method are the treatment of a slime with a unique flocculant and the separation of the clarified slime from the aggregated floccules.

Our method is primarily based upon the discovery that the unique flocculant described below is useful in slime clarification. This discovery is based upon the further discoveries that the surfactant in this flocculant bridges the slime particles electrostatically to the colloidal magnetic particles in this flocculant, and serves to stabilize the magnetic particles until a certain dilution point of the flocculant is reached, and is based upon the further discovery that there is a particle-to-particle titration between the slime particles and the magnetic particles.

In the past, aqueous-base magnetic fluids have been known to be a problem to work with, since they precipitate. Therefore, those skilled in the art have generally avoided working with them. In our previous work involving another individual, we discovered a dilution stable, water-base magnetic fluid that overcomes the precipitation problem of prior art water-base magnetic fluids. This particular fluid contains at least one aliphatic monocarboxylic acid, such as lauric acid. In this previous work, we noted that although dodecylamine forms a precipitation-resistant, water-base magnetic colloid, an irreversible flocculation thereof occurs upon 25-fold dilution with water, the undiluted fluid having a saturation magnetization of 200 gauss. This prior work is reported in S. E. Khalafalla and G. W. Reimers, "Preparation of Dilution-Stable Aqueous Magnetic Fluids", *I.E.E.E. Transactions on Magnetics*, Vol. 16(2), pp. 178–183 (Mar. 1980), and in U.S. patent application Ser. No. 11,292 of ourselves and S. Rholl, entitled "Dilution-Stable, Water-Base Magnetic Fluids".

Our method is useful for treating any slime, in order to clarify it. The slime may, for example, be a process water slime. Illustrative slimes are an iron oxide slime, an oxidized taconite slime, scrubber water from an iron-making furnace and kaolin slime. These slimes and most naturally occurring slimes are negatively charged. A magnesium oxide slime has a positive charge. In some cases, the slime is treated as is and in others, the pH of the slime is adjusted, for example, to make the slime more basic or to change the slime pH from acid to base.

The unique flocculant used in our method is a stabilized aqueous-base magnetic colloid that contains colloidal magnetic particles and at least one surfactant that bridges the slime particles electrostatically to the magnetic particles and that stabilizes the magnetic particles. The aqueous base is suitably water. By "colloidal" is meant a particle size in the range of about $10^{-5}$ to $10^{-7}$ meter. The colloidal magnetic particles useful in our method are suitably magnetite particles and have a size that conveniently ranges from about 50 to 100 Å. There is hereby incorporated by reference into this application the disclosure pertaining to colloidal magnetic particles found in the Transactions publication and U.S. patent application Ser. No. 11,292, discussed above.

The surfactant is present in the magnetic colloid, in an amount sufficient to perform the bridging and stabilization functions. The magnetic colloid becomes unstable and the magnetic particles of the colloid irreversibly flocculate when the colloid is sufficiently diluted. The magnetic colloid is used in an amount sufficient to provide for particle-to-particle titration between the slime particles and the magnetic particles. As a result of this treatment step, the magnetic particles form floccules with the slime particles. The slime particles are colloidal in size, and/or are of a size greater than colloidal. The bridging function provided by the surfactant is electrostatic in type, and therefore, provides interparticle forces that are orders of magnitude stronger than simple magnetic flocculation or gravity. Specifically, the electrostatic coagulation provided by our method is roughly 16 orders of magnitude stronger than magnetic flocculation, which is, in turn, 4 orders of magnitude stronger than gravity sedimentation. The result of the presence of these stronger forces is a rapid settling time of only a few minutes for complete particle sedimentation.

The particle-to-particle titration provided by our method results in the need for only a very small volume of our magnetic colloid to flocculate slimes. This particle-to-particle titration may be regarded as a special case of "particulate turbidimetric titrations". Because the magnetic colloid is in the colloidal state ($10^{16}$ to $10^{18}$ particles per ml), while the slime is in the suspensoidal state ($10^8$ to $10^{11}$ particles per ml for 0.1% loading of 1 and 0.1 micron particles, respectively), a minute volume of the magnetic colloid is sufficient to titrate a given volume of the slime in a particle-to-particle fashion. The number of magnetic particles required to coat each slime particle to the point of incipient magnetic coagulation corresponds to the "slime particulate equivalence" with respect to a given magnetic colloid in accordance with our invention.

In carrying out our treatment step, it is preferable to use the magnetic colloid as an outside reagent. Use as an outside reagent involves adding the magnetic colloid to the slime. Use of the colloid as an outside reagent conveniently permits storage in a very small volume. The colloid however, may be diluted prior to use. An alternative manner of carrying out the treatment step is to generate the colloidal magnetic particles in situ in the slime. For in situ preparation, Fe(II) and Fe(III) are precipitated in the molar ratio described below. The disadvantage with an in situ preparation of the magnetic colloid is that the magnetic particles are coarser, thus increasing the reagent requirement for slime clarification.

As a result of the treatment step described above, the magnetic particles form floccules with the slime particles. These floccules aggregate, and in the next essential step of our method, the clarified slime is separated from the aggregated floccules. Separation is by gravity or by use of a magnetic field. Using gravity, complete separation requires only minutes. The requirement of a brief residence time, in turn, means that for a given slime, the physical size of the settling tank can be significantly smaller than with other methods, since the slime is processed more rapidly.

The use of a magnetic field has the further advantage of making the settling time even shorter and is, therefore, preferable. The magnetic field is suitably provided by a permanent magnet. When it is desirable to treat the slime by our method at very high flow rates, it is convenient to use high intensity magnetic filtration. For example, a 2.5 kilogauss magnetic filter will process about 59 gallons per minute per sq. ft. of a fairly well clarified colloidal suspension of slimes from oxidized taconites.

In the preferred embodiment of our method, a negatively charged slime is treated with an amine-stabilized magnetic colloid that has a net positive charge. The amine stabilizing agent is a $n$-$C_{10}$ to $n$-$C_{15}$ aliphatic amine. The net positive charge of the colloid is provided by the amine. The positive charge of the amine bridges the negatively charged slime particles electrostatically to the colloidal magnetic particles. In order to perform this particle-bridging function, as well as the stabilization function discussed earlier, the amine is suitably present in an amount ranging from about 20 to 30% of the magnetic particles, on a weight basis. Preferably, the amount of the amine is about 25% of the magnetic particles, on a weight basis.

A preferred amine is dodecylamine. A magnetic colloid containing dodecylamine in an amount that is approximately 25% of the magnetic particles, on a weight basis, and containing about 20 w/v% of the magnetic particles, which have a size ranging from about 50 to 100 Å, has a saturation magnetization of about 200 gauss. This colloid becomes unstable and the magnetic particles thereof irreversibly flocculate when diluted to a magnetization less than about 1 to 3 gauss. This magnetic colloid is the most preferred magnetic colloid for use in our method. An identical magnetic colloid, except that the amount of dodecylamine is only about 20%, on a weight basis, of the magnetic particles becomes unstable and irreversibly flocculates upon approximately 25-fold dilution with water. Broadly speaking, the preferred dodecylamine-stabilized magnetic colloid used in our method has dodecylamine present in an amount ranging from about 20 to 30% of the magnetic particles, on a weight basis, and the magnetic particles have a size ranging from about 50 to 100 Å.

In carrying out our method, the magnetic colloid is used in an amount sufficient to provide for particle-to-particle titration between the slime particles and the magnetic particles. This amount is determined by the slime concentration, in terms of the particles of slime per milliliter, and by the gauss of the magnetic colloid. The gauss is proportionate to the magnetic particles per milliliter. Thus a more concentrated slime, for example, requires more milliliters of the magnetic colloid, when the gauss is held constant, and requires a greater concentration of magnetic particles per milliliter, when the volume of the magnetic fluid is held constant.

We prepare our unique flocculant by using a modified peptization method. This method and the production of one embodiment of our unique flocculant is described in the first three paragraphs of Experimental Procedure and Results reported in the Transactions publication discussed earlier. This procedure is hereby incorporated by reference into this application. Broadly speaking, this method involves dissolving amounts of $FeCl_2.4H_2O$ and $FeCl_3.6H_2O$ that provide a molar ratio of approximately 1.3:1 of Fe(III) to Fe(II). The salts are dissolved in water, the solutions are combined, and ammonium hydroxide is added as a precipitating agent to the combined solutions while mixing. The resulting iron precipitate is placed onto a permanent magnet to accelerate settling, and after standing on the magnet for about 5 minutes, the precipitate is separated from the clear salt solution by decanting. The precipitate is then washed by mixing with an approximately 5% aqueous ammonium hydroxide solution. This mixture is placed on a permanent magnet for about 5 minutes before separating the washed precipitate therefrom by decanting off the clear solution. The amine is then added to the precipitate and the solution is adjusted to the desired volume.

Specific examples of the present invention will now be set forth. Unless otherwise indicated, all percentages are weight/volume, and all steps are carried out at atmospheric pressure and ambient temperature. A calibrated Hack Model 2100 A turbidimeter is used for making the turbidity readings. It is to be understood that these examples are merely illustrative, and are not in any way to be interpreted as limiting the scope of the invention.

EXAMPLE 1

Using a stabilized aqueous-base magnetic colloid in accordance with the invention that contains dodecylamine as the stabilizing agent and magnetite, and that has a saturation magnetization of 5 gauss, an iron oxide slime sample having a solid content of 0.035% is treated with incremental amounts of the magnetic colloid. The dodceylamine is present in the magnetic colloid in an amount that is 25% of the magnetic particles, on a weight basis. The untreated slime sample has a slight orange tint and a turbidity reading of 59 NTU (Nephlometric Turbidity Unit). The magnetic colloid is added by titration using a micrometer buret to 100 ml of the slime sample. Table 1 shows the volumes of magnetic colloid added and the resulting NTU readings. From the data set forth in Table 1, it can be seen that the end point of the turbidometric titration occurs at about 0.5 ml.

COMPARATIVE EXAMPLE 1

Another sample of the slime used in Example 1 was filtered through a Whatman No. 42 paper. The turbidity of the filtrate was 20 NTU, and the filtrate was obviously cloudy. In contrast, the sample treated in the previous example is visibly clear with less than 5 NTU when titrated past the end point. This demonstrates the superiority of our method over ordinary filtration and shows that our method is capable of clearing water from not only coarser and filtrable particles, but also from most of the finer and nonfiltrable particulates.

EXAMPLE 2

Using a stabilized aqueous-base magnetic colloid in accordance with the invention that contains dodecylamine as the stabilizing agent and magnetite, an iron oxide slime having a solid loading of 0.5% is treated with various quantities of the magnetic colloid. The amount of the dodecylamine is 25% of the magnetic particles, on a weight basis, and the magnetic colloid has a saturation magnetization of 5 gauss. Table 1 shows the volumes of the magnetic colloid added and the resulting NTU readings. The magnetic colloid is added to 100 ml of the slime sample, which has an initial NTU of 48,500. The data shown in the Table illustrates a drastic reduction in turbidity upon the addition of the magnetic colloid.

TABLE 1

|  | ml | NTU |
| --- | --- | --- |
| Example 1 | 0.25 | 20 |
|  | 0.5 | 8.5 |
|  | 1.0 | 5.5 |
|  | 1.5 | 5.5 |
|  | 2.0 | 4.5 |
|  | 2.5 | 4.0 |
|  | 3.0 | 3.5 |
|  | 3.5 | 3.5 |
|  | 4.0 | 3.5 |
| Example 2 | 2 | 38,000 |
|  | 4 | 8,900 |
|  | 5 | 1,720 |
|  | 6 | 335 |
|  | 8 | 27 |
|  | 10 | 14 |
|  | 12 | 6 |
|  | 16 | 4 |
|  | 20 | 10 |
|  | 24 | 18 |
| Comparative Example 2 | 10 | 44,500 |
|  | 30 | 42,500 |

COMPARATIVE EXAMPLE 2

Using the identical magnetic colloid used in Example 2, except that lauric acid is used as the stabilizing agent, rather than dodecylamine, for treating 100 ml of another sample of the slime used in Example 2, which again has an initial NTU of 48,500, the results shown in Table 1 are obtained. These results show the volumes of the magnetic colloid (5 gauss saturation magnetization) added and the resulting NTU readings. This data shows that the lauric acid-stabilized fluid has no substantial beneficial effect. A lauric acid-stabilized fluid is dilution stable.

EXAMPLE 3

Using a stabilized aqueous-base magnetic colloid in accordance with the present invention that contains dodecylamine as the stabilizing agent and magnetite, and has a saturation magnetization of 5 gauss, various dilutions of a slime are treated with certain quantities of the magnetic colloid. The amount of the dodecylamine in the magnetic colloid is 25% of the magnetic particles, on a weight basis. The slime is an iron oxide slime. Untreated slime having a solid content of 0.6% has an initial turbidity reading of 60,000 NTU. Using the magnetic colloid, the results shown in Table 2 are obtained. The magnetic colloid is added to 100 ml of the slime.

The same slime is diluted to a solid content of 0.3% and treated with the same magnetic colloid as used in the previous paragraph. Table 3 shows the various volumes of the magnetic colloid added and the resulting NTU readings. The magnetic colloid is added to 100 ml of the slime, which has an initial NTU of 31,500.

The same slime, but having a solid content of 0.06%, is treated with the same magnetic colloid used in the first paragraph of this example. The volumes of the magnetic colloid added and the resulting NTU readings are shown in Table 4. The magnetic colloid is added to 100 ml of the slime, which has an initial NTU of 5,100.

TABLE 2

| ml | NTU |
| --- | --- |
| 5 | 21,500 |
| 7 | 800 |
| 8.5 | 105 |
| 10 | 44 |
| 12 | 48 |
| 14 | 29 |
| 15 | 20 |
| 17.5 | 27 |
| 20 | 25 |

TABLE 3

| ml | NTU |
| --- | --- |
| 1.5 | 2,900 |
| 2 | 830 |
| 2.5 | 120 |
| 3 | 36 |
| 3.5 | 51 |
| 4 | 32 |
| 5 | 22 |
| 6 | 44 |
| 8 | 20 |

TABLE 4

| ml | NTU |
| --- | --- |
| 0.15 | 1,900 |
| 0.3 | 1,100 |
| 0.5 | 620 |
| 0.7 | 330 |
| 0.85 | 160 |
| 1 | 76 |
| 1.2 | 14 |
| 1.5 | 43 |
| 1.75 | 21 |
| 2 | 24 |
| 2.25 | 20 |

TABLE 5

| ml | NTU |
| --- | --- |
| 0.15 | 230 |
| 0.3 | 59 |
| 0.5 | 62 |
| 0.7 | 19 |
| 1 | 12 |
| 1.2 | 7 |
| 1.5 | 6 |
| 2 | 4 |

TABLE 6

| ml | NTU |
| --- | --- |
| 0.1 | 26 |
| 0.15 | 18 |
| 0.25 | 8.9 |
| 0.3 | 4.6 |
| 0.4 | 4.3 |
| 0.5 | 5.4 |
| 0.6 | 5 |
| 0.8 | 3.6 |
| 1 | 3.3 |

TABLE 7

| ml | NTU |
| --- | --- |
| 0.1 | 19 |
| 0.2 | 12 |
| 0.4 | 3.2 |
| 0.5 | 1.1 |
| 1 | 1.7 |
| 2 | 3 |

The same slime, but having a solid content of 0.006%, is treated with the same magnetic colloid used in the first paragraph of this example. The volumes of the magnetic colloid added and the resulting NTU readings are shown in Table 5. Magnetic colloid is added to 100 ml of the slime, which has an initial NTU reading of 420.

The same slime, except that the solid content is 0.0006%, rather than 0.6%, is treated with the same magnetic colloid used in the first paragraph of this example. Again, as with the other slimes treated in this example, the treatment is with various amounts of the magnetic colloid. The results are shown in Table 6. The magnetic colloid is added to 100 ml of the slime, which has an initial NTU reading of 41.

When the data shown in the various tables for this example is plotted, a similarity between the curves in the plots and traditional acidimetric, potentiometric, conductomertic and amperometric titration curves suggests that the magnetic fluid particles are essentially titrating the slime particles.

EXAMPLE 4

A colloidal suspension of slimes from the selective flocculation of oxidized taconites is treated with 80 ppm calcium ion in the form of saturated lime water. The lime treatment is sufficient to flocculate most of the suspended solids and provide a coarse precipitate that easily settles down. The pH increases to about 11 as a result of the lime treatment. The supernatant liquid still has a suspended solid content of approximately 100 ppm. To this supernatant liquid, there is added a stabilized aqueous-base magnetic colloid in accordance with the invention that contains dodecylamine as the stabilizing agent and magnetite. The amount of dodecylamine is 25% of the magnetic particles, on a weight basis. The magnetic colloid is used in an amount of 0.1 ml of 1 gauss/liter of the slime. The resulting mixture is passed through a 2.5 kilogauss magnetic filter at a flow rate of 4 cm per second (59 gallons per minute per sq. ft.). The resulting filtrate has a turbidity of 1 NTU, which is equivalent to that of ordinary tap water. Amine consumption is 50 ppm or 0.42 lb. per 1,000 gallons (4.2 tons) of water treated. Magnetic fluid consumption corresponds to a magnetite of 95 ppm or 0.79 lb. per 1,000 gallons.

EXAMPLE 5

Venturi scrubber water from a cupola iron-making furnace employing low-grade scrap is collected and initially treated by coagulation with 0.64 g of lime per liter of scrubber water. The slurry pH is increased from 4.1 to 7.1. The decrease in turbidity is from 88 to 4.7 NTU. To the lime-treated scrubber water, there is added a stable aqueous-base magnetic colloid in accordance with the invention that contains dodecylamine as the stabilizing agent and magnetite. The amount of dodecylamine is 25% of the magnetic particles, on a weight basis. The amount of the magnetic colloid used is 0.1 ml of 2 gauss/liter of this scrubber water. The result is that the scrubber water is improved from 4.7

NTU to 2.3 NTU. Magnetic filtration is used to remove the precipitate.

EXAMPLE 6

A slime containing about 1.2 g kaolin per liter stabilized with NaOH at pH 10.7 is treated with a stabilized aqueous-base magnetic colloid in accordance with the invention that contains dodecylamine as the stabilizing agent and magnetite and has a saturation magnetization of 10 gauss. The amount of dodecylamine is 25% of the magnetic particles, on a weight basis. Table 7 shows the results obtained. The magnetic colloid is added to 100 ml of the slime, which has an initial turbidity of 40 NTU. To 100 ml aliquots of the slime, amounts of the magnetic colloid between 0.1 and 2.0 ml are added. After mixing, the samples begin to clarify and are then allowed to stand on a permanent magnet for 24 hours. As can be seen from the data in Table 7, the break in the titration curve occurs at an addition of 0.5 ml of the magnetic colloid. Beyond this point, perceptible increases in turbidity are recorded.

INDUSTRIAL APPLICABILITY

The method of this invention is useful in water treatment. It is of importance to chemical and metallurgical industries and to city municipalities.

We claim:

1. A method for clarifying slimes from the group consisting of iron oxide slimes, oxidized taconite slimes, scrubber water from iron-making furnaces, and kaolin slimes, said method comprising the steps of
   (a) treating the slime with a stabilized aqueous-base magnetic colloid comprising (1) colloidal magnetic particles and (2) at least one surfactant that bridges the slime particles electrostatically to said magnetic particles and that stabilizes said magnetic particles, said surfactant being present in an amount sufficient to perform the bridging and stabilization functions; said magnetic colloid becoming unstable and said magnetic particles thereof irreversibly flocculating when said magnetic colloid is sufficiently diluted, and said magnetic colloid being used in an amount sufficient to provide for particle-to-particle titration between said slime particles and said magnetic particles,
   whereby said magnetic particles form floccules with said slime particles; and
   (b) separating the clarified slime from the aggregated floccules.

2. The method of claim 1 wherein said slime is negatively charged, said magnetic colloid is amine-stabilized and has a net positive charge, and the amine-stabilizing agent is a $n\text{-}C_{10}$ to $n\text{-}C_{15}$ aliphatic amine.

3. The method of claim 2 wherein said aliphatic amine is dodecylamine.

4. The method of claim 2 wherein said aliphatic amine is present in an amount ranging from about 20 to 30% of said magnetic particles, on a weight basis.

5. The method of claim 4 wherein the amount of said aliphatic amine is about 25% of said magnetic particles, on a weight basis.

6. The method of claim 1 wherein said magnetic particles have a size ranging from about 50 to 100 Å.

7. The method of claim 4 wherein said aliphatic amine is dodecylamine, the amount of said magnetic particles is about 20 w/v%, and said magnetic particles have a size ranging from about 50 to 100 Å.

8. The method of claim 1 wherein said magnetic particles are magnetite particles.

9. The method of claim 1 wherein the clarified slime is separated from the aggregated floccules by gravity.

10. The method of claim 1 wherein the clarified slime is separated from the aggregated floccules by the use of a magnetic field.

11. The method of claim 10 wherein high intensity magnetic filtration is used for the separation.

* * * * *